(12) United States Patent
Grimm et al.

(10) Patent No.: US 6,536,832 B1
(45) Date of Patent: Mar. 25, 2003

(54) VEHICLE DOOR INCLUDING STRUCTURAL ELEMENT SUPPORT FOR A FUNCTIONAL COMPONENT

(75) Inventors: Rainer Grimm, Frankfurt (DE); Klaus-Dieter Strauss, Braunschweig (DE); Daniel Drewniok, Frankfurt (DE); Harald Kollner, Altenstadt (DE); Georg Wurm, Bad Homburg (DE); Arnd G. Herwig, Baunach (DE); Patrick Hof, Marburg (DE); Simon Blair Dobson, Folkestone (GB); Gregory Keyes, Birmingham (GB); Kenneth W. Schang, Plymouth, MI (US)

(73) Assignee: Arvin Meritor GmbH, Frankfurt (DE)

( * ) Notice: Subject to any disclaimer, the term of this patent is extended or adjusted under 35 U.S.C. 154(b) by 0 days.

(21) Appl. No.: 09/672,468

(22) Filed: Sep. 28, 2000

(30) Foreign Application Priority Data

Sep. 28, 1999 (DE) .......................................... 199 46 311

(51) Int. Cl.[7] .................................................. B60J 5/00
(52) U.S. Cl. ................................ 296/146.6; 296/146.7; 296/146.5; 49/502; 49/503
(58) Field of Search ............................ 296/146.6, 146.7; 49/502, 352, 348, 374, 503

(56) References Cited

U.S. PATENT DOCUMENTS

| | | | | |
|---|---|---|---|---|
| 3,791,693 A | * | 2/1974 | Hellriegel et al. ........... | 295/146 |
| 3,950,894 A | * | 4/1976 | DiMaio ........................ | 49/503 |
| 3,964,208 A | * | 6/1976 | Renner et al. ............ | 296/146.6 |
| 4,300,315 A | * | 11/1981 | Holzwarth .................... | 49/501 |
| 4,306,381 A | * | 12/1981 | Presto ...................... | 296/146.5 |
| 4,328,642 A | * | 5/1982 | Presto ......................... | 49/502 |
| 4,428,157 A | * | 1/1984 | Engelsberger et al. ........ | 49/502 |

(List continued on next page.)

FOREIGN PATENT DOCUMENTS

JP 62-1625 * 1/1987

Primary Examiner—Kiran Patel
(74) Attorney, Agent, or Firm—Carlson, Gaskey & Olds, P.C.

(57) ABSTRACT

A motor vehicle door includes structural parts for providing the rigidness of the vehicle door and includes a structural element and a lining element. The door further includes function components for providing vehicle door functions like a window panel with a regulator. At least one of the structural parts serves as a support of the function components. In order to reduce the number of individual components, at least one of the structural parts forms a completely shaped composite or sandwich part having a plastic based matrix and further having several of the function components included to serve a rigidness providing bodies. The bodies are molded into the plastic based matrix by the plastic based matrix.

19 Claims, 3 Drawing Sheets

U.S. PATENT DOCUMENTS

| | | | | |
|---|---|---|---|---|
| 4,512,240 A | * | 4/1985 | Mahler et al. | 49/503 |
| 4,648,208 A | * | 3/1987 | Baldamus et al. | 49/502 |
| 4,651,470 A | * | 3/1987 | Imura et al. | 296/146.6 |
| 4,769,951 A | * | 9/1988 | Kaaden | 296/146.6 |
| 4,882,842 A | * | 11/1989 | Basson et al. | 296/146 |
| 4,945,682 A | * | 8/1990 | Altman et al. | 296/146.5 |
| 5,033,236 A | * | 7/1991 | Szerdahelyi et al. | 49/502 |
| 5,325,632 A | * | 7/1994 | Djavairian et al. | 296/146.6 |
| 5,535,553 A | * | 7/1996 | Staser et al. | 49/502 |
| 5,548,930 A | * | 8/1996 | Morando | 49/502 |
| 5,581,947 A | * | 12/1996 | Kowall et al. | 49/502 |
| 5,715,630 A | * | 2/1998 | Szerdahelyi et al. | 49/502 |
| 5,822,921 A | * | 10/1998 | Griepenstroh et al. | 49/350 |
| 5,822,927 A | * | 10/1998 | Hellenkamp et al. | 49/502 |
| 5,857,732 A | * | 1/1999 | Ritchie | 296/146.5 |
| 5,864,987 A | * | 2/1999 | Mariel et al. | 49/352 |
| 5,871,253 A | * | 2/1999 | Erber | 296/146.6 |
| 5,921,576 A | * | 7/1999 | Sinnhuber | 280/730.2 |
| 5,927,020 A | * | 7/1999 | Kobrehel | 49/502 |
| 5,979,115 A | * | 11/1999 | Szerdahelyi et al. | 49/502 |
| 6,076,882 A | * | 6/2000 | Szerdahelyi et al. | 296/146.1 |
| 6,134,840 A | * | 10/2000 | Pleiss | 49/502 |
| 6,141,910 A | * | 11/2000 | Kobrehel et al. | 49/352 |
| 6,161,337 A | * | 12/2000 | Morando | 49/352 |
| 6,164,716 A | * | 12/2000 | Palazzolo et al. | 296/146.6 |
| 6,185,872 B1 | * | 2/2001 | Seeberger et al. | 49/502 |
| 6,301,835 B1 | * | 10/2001 | Pfeiffer et al. | 296/146.5 |
| 6,364,397 B1 | * | 4/2002 | Bordeaux et al. | 296/146.2 |
| 6,390,533 B1 | * | 5/2002 | Furuse | 296/146.5 |
| 2001/0037607 A1 | * | 11/2001 | Pfeiffer et al. | 296/146.7 |
| 2002/0027376 A1 | * | 3/2002 | Marcovecchio et al. | 296/146.7 |
| 2002/0078631 A1 | * | 6/2002 | Hock et al. | 49/502 |

* cited by examiner

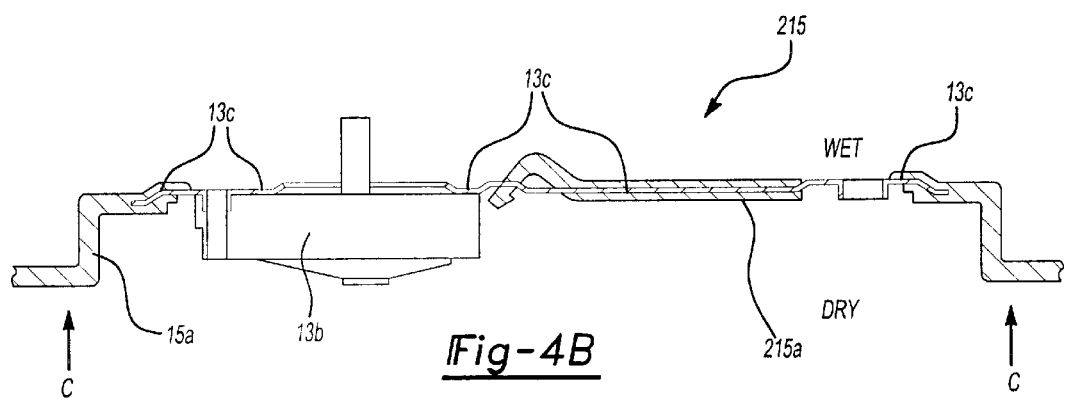
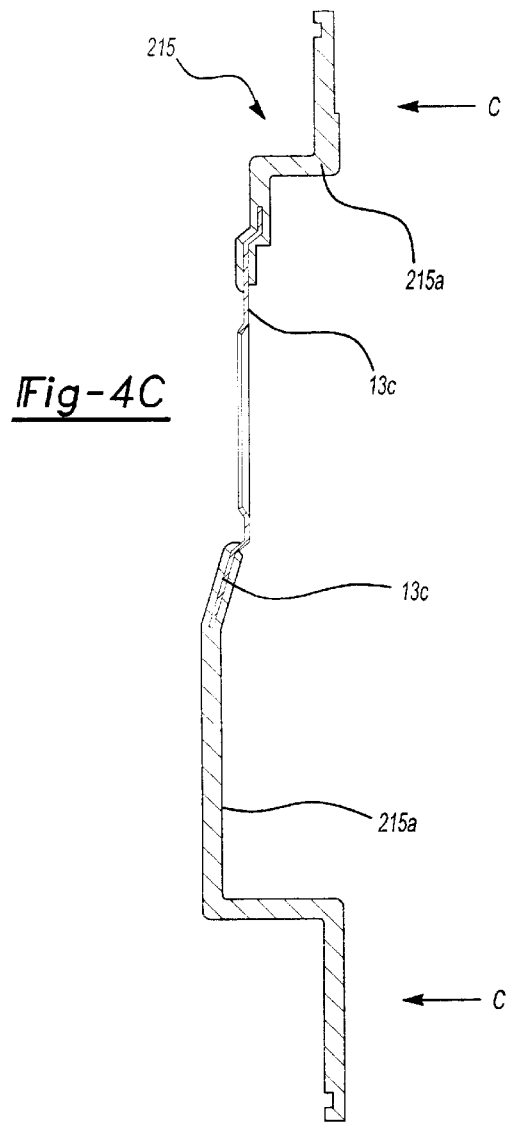

VEHICLE DOOR INCLUDING STRUCTURAL ELEMENT SUPPORT FOR A FUNCTIONAL COMPONENT

BACKGROUND OF THE INVENTION

The invention pertains to a motor vehicle door. The motor vehicle door may be a driver, passenger, rear side or stern door employing a pivot hinge or a sliding hinge.

In conventional vehicle doors, it is common to join the rigidness providing structural parts, such as a support or carrier element or a lining element, with various functional components which provide the vehicle door functions, such as window regulators. Previously, these individual components have been manufactured and handled separately. The functional components have been connected directly or indirectly to the support or carrier element by hinges, hinge straps or similar movement elements and/or closing elements. A drawback to the prior art door is that the connector of the functional component to the support or carrier element is expensive and subject to strict manufacturing tolerances. There is also an increased demand for rigidness of the door as the weight of the door is reduced.

While vehicle doors made in one piece out of plastic are known per se in the art (DE 1 655 656 A), these prior art doors have utilized a molded-in steel plate. The functional components are fixed to the steel plate by standard methods like screwing or welding. A disadvantage of this prior art door is that strong loads are exerted upon the molded plate by the functional components. Additionally, as the plastic must be made strong enough for carrying such loads, the plastic is heavy.

SUMMARY OF THE INVENTION

The vehicle door of the present invention reduces the number of components in the door while providing for an inexpensive, lightweight, and durable vehicle door. A molded composite or sandwich structural part, hereinafter collectively called a foamed component, is manufactured as a structural carrier or support of a vehicle door. The foamed components includes a plastic based matrix. Functional components, which serve as rigidness providing bodies which are molded in (completely or in part) and connected to each other by virtue of said plastic based matrix. The vehicle door of the present invention is comparably light in weight and of non-flexural design. As the functional components are molded in, the forces are well distributed.

The foamed component of the vehicle door of the present invention is able to withstand the forces of drive and the forces of the moving components due to the combination of inherent stability and the functional components which are molded in to form the foamed component of this invention. Watertightness is also achieved.

The functional components employed to serve as rigidness providing bodies for the foamed component can be rails or windowpane guides or channels, a drive ground plate or motor housing or a window regulator, speakers, crash pads or crash beams, a latch housing, or an airbag system. It is to be understood that any common functional component can be utilized.

The aforementioned, and also the claimed features described in the preferred embodiments hereafter to be used according to this invention, are not subject to any special exceptional conditions with regard to their size, configuration, material selection and technical design, so that the selection criteria known for the particular application can be used unrestricted within the framework of the claims.

BRIEF DESCRIPTION OF THE DRAWINGS

Additional details, properties and advantages of the subject of the present invention will arise from the subclaims and the following description of the included Fig., in which the preferred design format of the vehicle door is presented as an example.

FIG. 4B shows the same structural part in a section view along line A—A of FIG. 4A; and FIG. 4C shows the same structural part in a section view along line B—B of FIG. 4A.

DETAILED DESCRIPTION OF THE PREFERRED EMBODIMENT

Figure 1:
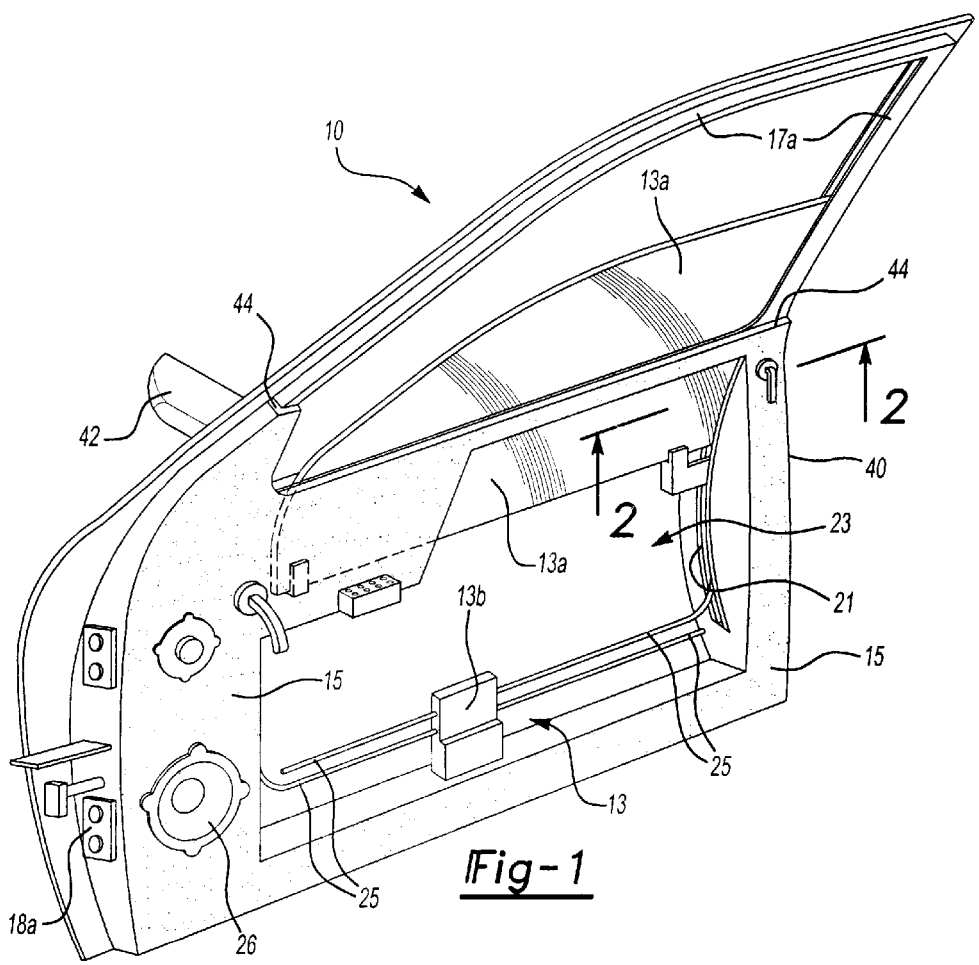
FIG. 1 shows a perspective view of a vehicle door from the inner side.

FIG. 1 shows a passenger door 10 of a motor vehicle from the inside of the vehicle, with the inner lining element 30 removed. The vehicle door 10 includes a one-part, foamed component 15 which represents a completely shaped composite or sandwich part, and acts as the structural carrier or support for the vehicle door 10. A fully visible metal frame reinforcement element 17A having a comparatively thin cross section is used with a closed windowpane 13A. As shown in FIG. 1, the end regions 44 of the reinforcing element 17A are molded in the foamed component 15. Function components of the vehicle door, such as two parallel windowpane guide profiles 21, are embedded in whole or in part in the foamed component 15. The functional components can also be halves of a hinge 18A, a loudspeaker 26, a door lock 40 (shown schematically), as well as a mirror adjuster 42 (shown schematically), and a window crank 13.

The window pane 13A is located in a partially lowered position in a windowpane holding niche 23 formed inside of the vehicle door 10. The installation and removal of the windowpane 13A through the windowpane holding niche 23 is possible.

The window crank 13 includes a drive motor 13B molded into the foamed component 15 with a ground plate. From the window crank 13, flexible drive features 25 lead horizontally to the lateral and window guide profiles 21 run vertically following the curvature of the curved windowpane.

The complete or partial embedding of a functional component in the foam of the foamed component 15 is particularly favorable, especially when the functional components are a window guide profile 21 or window guide channel.

Figure 2:
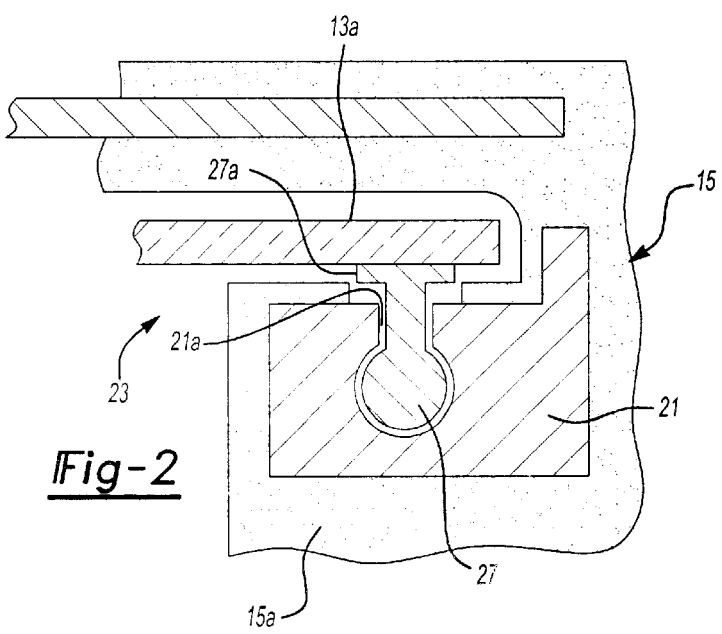
FIG. 2 shows a cross-sectional view of the vehicle door of FIG. 1 along line 1—1.

As can be seen from FIG. 2, the window guide profile 21, which is nearly completely embedded in a foamed plastic matrix 15A of the foamed component 15, has a channel with a smaller slot. A driven slider 27 is slidingly guided inside the profile 21. The driver slider 27 extends through the slot 21A and is connected to windowpane 13A via a base 27A.

The driven slider 27 may be made of plastic only, a combination of metal profiles encapsulated with plastic, or of pure metal profiles.

The functional component can be an in-molded crash beam used to close to the outer shell of the vehicle door 10. However, the functional component may be a crash pad in-molded close to the inner trim of the vehicle door 10.

The functional components are preferably of a different type of material than the plastic based matrix 15A. However, the functional components may also be of the same material as the plastic based matrix 15A and may be made in one piece with the plastic based matrix 15A.

Figure 3:
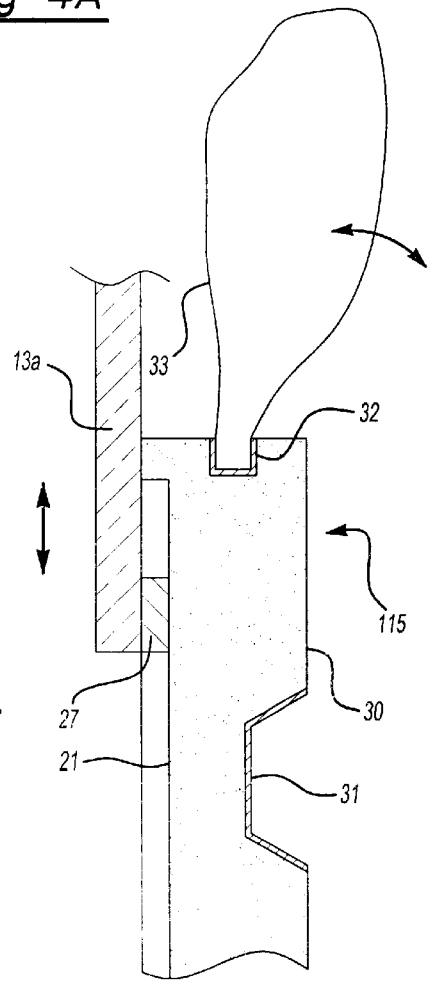
FIG. 3 shows an inner lining element, window guide rails, and an airbag in vertical section.

As can be seen from FIG. 3, the foamed component 115 which represents the function component carrying or supporting structural part may be an inner lining element 30 of the vehicle door 10. In this feature of the invention, three functional components are molded in the foamed component 115. The three functional components are a housing 31 for storing personal equipment, a housing 32 for storing a should or head airbag 33 (the airbag being shown in inflated upright position), and a window pane guide profile 21 having a slider 27 guided along the window pane guide profile 21. In this respect the inner lining element 30 acts as both the inner trim and the door module at the same time.

Figure 4A:
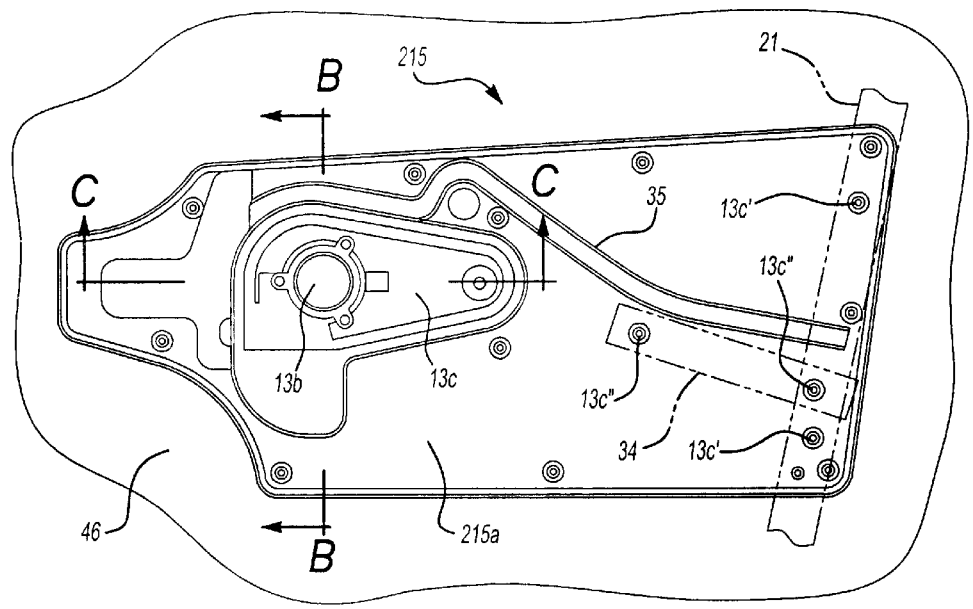
FIG. 4A shows a side view of another structural part in form of a door module.

As shown in FIG. 4A to 4C, the foamed component 215 forms a door module for closing the access opening of an inner sheet metal 46 (shown schematically) of the vehicle door 10. As can best be seen from FIG. 4B and 4C, a base plate 13C is molded in the plastic based matrix 215A and carries the motor 13B of a window regulator. Further molded in base plates 13C' and 13C" are the window pane guide profile 21, shown in dashed lines, and a window regulator guide rail 34, shown in dashed-dotted lines, respectively. A channel 35 for electrical wiring is molded in as well.

In all embodiments, the foamed plastic based matrix 15A can be made of any standard product and method. Clearly, this plastic based matrix 15A must be strong enough by itself to avoid breaking. Fiber reinforcement or an equivalent can be used within the plastic based matrix 15A according to standard techniques to add strength.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A vehicle door comprising:
    a structural element for providing rigidness of said vehicle door and connected to at least one closing element;
    a lining element; and
    at least one functional component for providing vehicle door functions, said structural element supporting said at least one functional component and said structural element further including a plastic based matrix, said at least one functional component molded into said plastic based matrix.

2. The vehicle door as recited in claim 1, wherein said at least one closing element is embedded into said structural element.

3. The vehicle door as recited in claim 1 wherein said at least one closing element is a hinge unit.

4. The vehicle door as recited in claim 1 wherein said at least one functional component is a windowpane guide profile.

5. The vehicle door as recited in claim 4 wherein a slider is slidingly guided in said windowpane guide profile, and a windowpane is connected to said slider.

6. The vehicle door as recited in claim 5 wherein said windowpane is received in a windowpane holding niche.

7. The vehicle door as recited in claim 4 wherein another of said at least one functional component is a motor for a window crank.

8. The vehicle door as recited in claim 1 wherein said at least one functional component is a speaker.

9. The vehicle door as recited in claim 1 wherein said least one functional component is an airbag.

10. The vehicle door as recited in claim 1 wherein said at least one functional component is a housing for storage.

11. The vehicle door as recited in claim 1 wherein said least one functional component is a crash pad.

12. The vehicle door as recited in claim 1 wherein said least one functional component is a crash beam.

13. The vehicle door as recited in claim 1 wherein said lining element is said support element.

14. The vehicle door as recited in claim 1 further including a base plate molded into said plastic based matrix.

15. The vehicle door as recited in claim 14 wherein said base plate supports a windowpane guide rail.

16. The vehicle door as recited in claim 14 wherein said base plate supports a motor for a window crank.

17. The vehicle door as recited in claim 14 wherein said base plate supports a window regulator guide rail molded in said base plate.

18. The vehicle door as recited in claim 14 wherein a channel for electrical wiring is molded in said base plate.

19. The vehicle door as recited in claim 1 wherein said plastic based matrix secures said at least one functional component to said vehicle door.

* * * * *

UNITED STATES PATENT AND TRADEMARK OFFICE
CERTIFICATE OF CORRECTION

PATENT NO.   : 6,536,832 B1
DATED        : March 25, 2003
INVENTOR(S)  : Grimm et al.

It is certified that error appears in the above-identified patent and that said Letters Patent is hereby corrected as shown below:

<u>Title page,</u>
Item [75], Inventor Dobson's address should be corrected as follows:

-- Kent (GB); --

Signed and Sealed this

Fifth Day of August, 2003

JAMES E. ROGAN
*Director of the United States Patent and Trademark Office*